Figure 1:
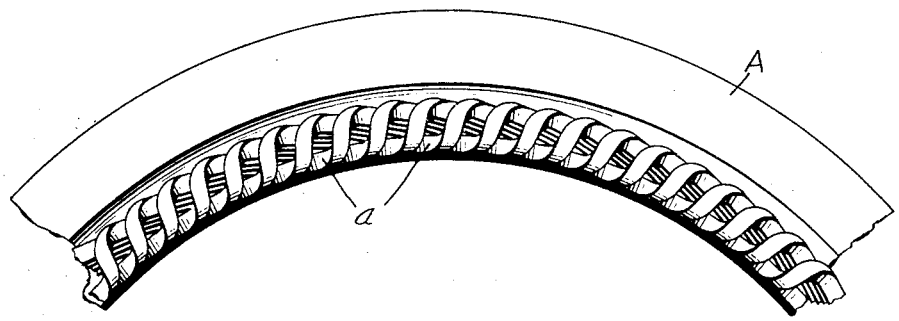

No. 859,358. PATENTED JULY 9, 1907.
E. F. W. ALEXANDERSON.
ALTERNATING CURRENT MOTOR.
APPLICATION FILED AUG. 19, 1905.

3 SHEETS—SHEET 3.

Witnesses:
Marcus L. Byng.
Helen Orford

Inventor:
Ernst F. W. Alexanderson.
by Albert G. Davis
Atty.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

No. 859,358.  Specification of Letters Patent.  Patented July 9, 1907.

Application filed August 19, 1905. Serial No. 274,856.

*To all whom it may concern:*

Be it known that I, ERNST F. W. ALEXANDERSON, a subject of the King of Sweden, residing at Schenectady, county of Schenectady, State of New York, have invented certain new and useful Improvements in Alternating-Current Motors, of which the following is a specification.

My invention relates to alternating-current motors of the induction type, and particularly to motors having windings arranged to give different pole numbers for obtaining different speeds.

A number of arrangements have been devised heretofore in which by means of special windings alternating-current motors may be arranged to give different numbers of poles; but many of these special windings which have been suggested present certain difficulties in practice. There have also been suggested certain arrangements by means of which certain specific variations in pole numbers may be obtained with a standard type of winding. Thus, Patent No. 725,415, Dahlander & Lindstrom, April 14, 1903, shows an arrangement by means of which a three-phase motor with a standard winding may be connected for two speeds in the ratio of two to one. The number of speed ratios which can be obtained with standard windings is very limited, and consequently when it has been desired to arrange a motor for two different speeds bearing to each other a ratio not corresponding to those which can be obtained with the specific arrangements heretofore devised, it has been customary to superimpose two standard windings of different coil-widths one on the other. Since a standard winding has two coils in a slot, this arrangement necessitates four coils in each slot, so that very deep slots are required and a large amount of space is required for insulation, this space being practically wasted.

In accordance with my invention I provide the motor with a single set of distributed coils, all of uniform width, interlaced to form mechanically a single winding, this arrangement being the same as the standard barrel winding ordinarily employed for induction motors designed for a single speed, and then connect the coils electrically so as to form two independent windings arranged to produce different pole numbers. I preferably so arrange the coils that each coil of each winding has one side in the same slot with the opposite side of a coil of the other winding, since with this arrangement the conductors of each winding are distributed through all the slots so that minimum reactance and maximum power factor are obtained, and if the ordinary form of winding is adopted in which the two coils in a slot are arranged one above the other, then each coil is arranged with one side in the top and one side in the bottom of a slot.

Although mechanically considered the coils are interlaced to form a single winding, electrically each winding is distinct and is the equivalent of a standard single-speed winding, but in order to secure this arrangement, it is necessary to so design the winding that the coils of both windings may be uniform in width, as otherwise they would not interlace properly in the manner of a standard winding. It is therefore necessary to select such a coil width as will give a suitable pitch for all the pole numbers for which the motor is designed.

Having thus obtained a winding which, while similar in all respects mechanically to a single standard winding but which nevertheless comprises two electrically independent windings having different numbers of poles bearing to each other any desired ratios within certain limits, I contemplate as a further feature of my invention applying to one or both of these windings any suitable arrangement for varying the numbers of poles; thus by connecting the coils of one or both windings in a plurality of groups and bringing out proper terminal connections, I may arrange either one or both of the windings to be connected for any desired number of poles, limited only by the particular coil width chosen which, as above stated, must be such as will give a suitable pitch for all the pole numbers for which the motor is designed.

The difficulty of choosing a proper coil width increases of course with the pole numbers desired, but in most cases only three or four speeds are likely to be required and for such a range of speeds I am enabled to combine with a mechanically - single, electrically double-winding of the type described above, means for reversing the relative direction of current-flow through one-half of one or both of the windings in accordance with the arrangement described in Patent No. 725,415, above referred to and this particular combination constitutes one of the features of my invention.

Figure 2:
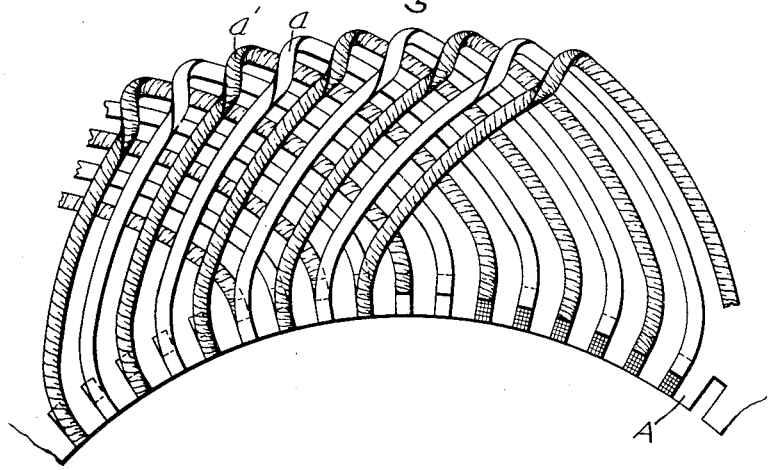
Figure 3:
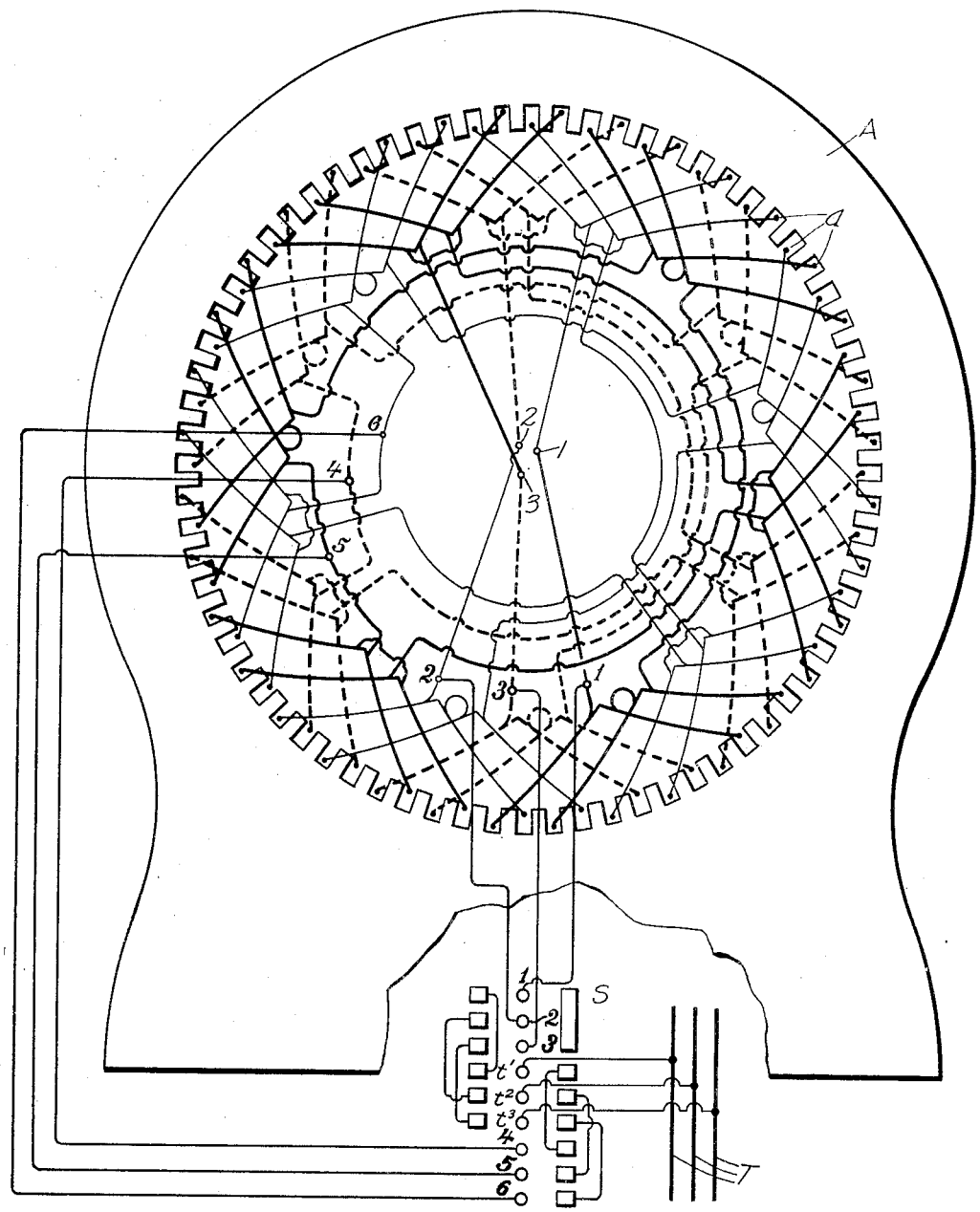

My invention will best be understood by reference to the accompanying drawings, in which Figure 1 shows a portion of a motor field structure arranged in accordance with my invention; Fig. 2 shows a somewhat diagrammatic view of the arrangement of the coils, the coils belonging to one winding being shaded to distinguish them from the coils of the other winding; Fig. 3 is a diagram showing the arrangement and connections of one winding; and Fig. 4 is a similar diagram showing the arrangement and a portion of the connections of the second winding.

In the drawings A represents the field structure of the motor, which is slotted in the usual manner on its inner periphery, and which is provided with a series of distributed coils $a$ $a'$ of uniform width, arranged with two coils per slot, one side of each coil being in the top of a slot and the other side in the bottom. As is clearly shown by Fig. 1, the arrangement of the coils is precisely the same as that of a standard barrel winding for a single speed. Adjacent coils, however, are connected in different windings, as is indicated in Fig. 2, every other coil in this figure being shown shaded. The shaded coils a' in this figure compose one winding, and the unshaded coils a comprise the other winding arranged to produce a different number of poles.

Figure 4:
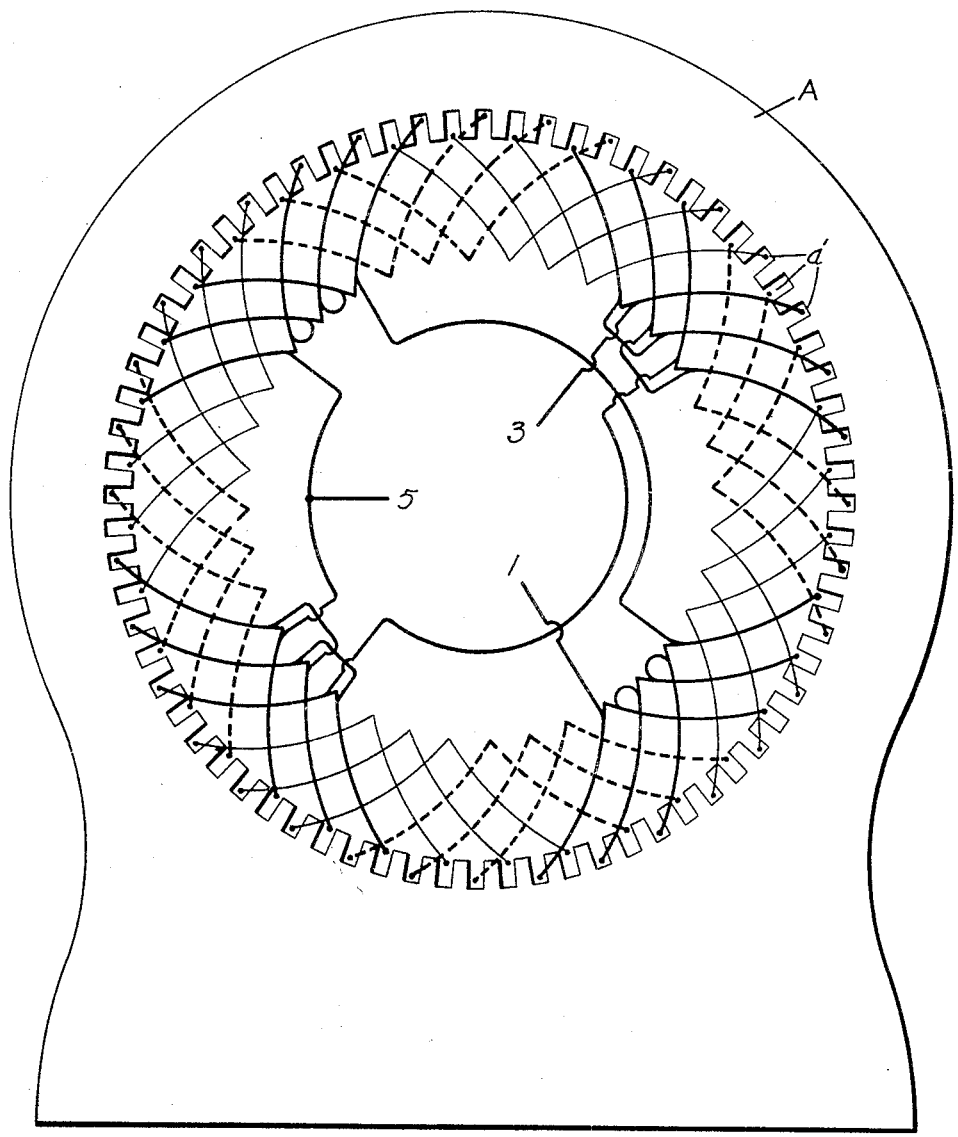

The connections of the coils in each winding are clearly shown in Figs. 3 and 4. In Fig. 3 one of the windings is shown arranged for six poles. It will be seen that as in the standard winding each coil has one side in the top and the other side in the bottom of a slot. The coil-width is equal to thirteen slots, and since there are seventy-two slots in the field structure, the pitch for the six-pole winding is a little greater than unity. A three-phase winding is shown, one phase being shown in heavy lines, the second phase in light lines, and the third phase in dotted lines. The winding is shown arranged and connected so that the relative direction of current may be reversed through one-half of each phase and the number of poles thereby doubled in accordance with the arrangement disclosed in Patent No. 725,415, before referred to. This arrangement is fully described in that patent, but in order to give a clear understanding of my invention I shall briefly describe the arrangement here. If the phase shown in heavy lines be considered, it will be seen that starting from the terminal 1 the circuit passes in series through the coils of alternate poles until the terminal 5 is reached. From this point the circuit continues through the coils of the remaining poles to the other terminal, 3, of that phase. It will be seen that if the terminals 1 and 3 are connected to a source of current, and if the relative direction of current-flow through all the coils be considered as in the same direction, then if the circuit is broken and current is supplied to the terminal 5, so that the current passes in opposite directions from point 5 to both points 1 and 3, the relative direction of current-flow through one-half of the winding will be reversed so that if, while the terminals 1 and 3 are connected to the source, the coils between the points 1 and 5 produce poles of one polarity, and the coils between the points 3 and 5 produce poles of another polarity, producing a total of six poles; then when the terminal 5 is connected to the source the coils will all produce the same polarity, so that the spaces between the coils will become poles of opposite polarity, and the number of poles will have been changed from six to twelve. The connections of the other two phases is the same as that of the phase which has just been described. The three phases are shown connected in delta. A switch S is provided by means of which their terminals 1, 2, 3, or 4, 5, 6, may be connected through the contacts $t^1$, $t^2$ and $t^3$ to the three-phase source of current T, to cause the motor to run at speeds corresponding to six and twelve poles respectively.

In Fig. 4 the second winding is shown. It will be seen that this winding is also arranged with coils having one side in the top and one side in the bottom of the slots. The tops and bottoms of the slots not utilized by the first winding are employed for this second winding, so that each slot contains one coil of each winding. This second winding is also shown as three-phase, the several phases being indicated in the same manner as before. The winding in Fig. 4 is arranged for four or eight poles, and since, as in the former case, the coil-width is equal to thirteen slots, the pitch is a little greater than two-thirds for the four-pole winding, which gives satisfactory results in operation. The winding in Fig. 4 has three coils per pole per phase, while the winding shown in Fig. 3 has only two coils per pole per phase. It will be seen that each of the windings in Figs. 3 and 4 is formed by selecting every other coil from the standard ordinary winding and connecting the coils so selected to give the desired number of poles and phase.

In order to simplify Fig. 4, the connections for only one phase are shown. The winding is adapted for connection for either of two numbers of poles in the same manner as the winding shown in Fig. 3. Thus, if the terminals 1 and 3 of Fig. 4 be connected to a source of current, that phase would be connected for four poles, while if one terminal of the source of current is connected to the terminal 5, while the other terminal of the source is connected to terminals 1 and 3, the winding would produce eight poles. The connections for the other two phases would be exactly the same as those of the phase shown, and a switch arranged and connected exactly as shown in Fig. 3 would suffice for varying the number of poles of the winding of Fig. 4.

Obviously, my invention is not limited to any particular number of poles or phases, and accordingly I do not desire to limit myself to the particular construction and arrangement of parts here shown, but aim in the appended claims to cover all modifications which are within the scope of my invention.

What I claim as new and desire to secure by Letters Patent of the United States, is,—

1. In an alternating-current motor, a slotted core provided with distributed coils all equal in size interlaced to form mechanically a single winding and electrically connected in independent sets to form two separate windings of different numbers of poles.

2. In an alternating-current motor, a slotted core provided with distributed coils all equal in size interlaced to form mechanically a single winding and electrically connected in independent sets to form two separate windings of different numbers of poles, each coil of each winding having one side in the same slot with the opposite side of a coil of the other winding.

3. In an alternating-current motor, a slotted core provided with distributed coils all equal in size, alternate coils being connected in independent sets to form two separate windings of different numbers of poles.

4. In an alternating-current motor, a slotted core provided with distributed coils all equal in size, each coil having one side in the same slot with the opposite side of another coil, and connections between alternate coils arranged to form two electrically independent windings of different numbers of poles.

5. In an alternating-current motor, a slotted core provided with distributed coils all equal in size, each coil having one side in the top and the other side in the bottom of a slot, and connections between alternate coils arranged to form two electrically independent windings of different numbers of poles, each slot containing one coil of each winding.

6. In an alternating-current motor, a slotted core, and two electrically independent windings of different pole numbers composed of interlaced coils all equal in size carried in the slots, the conductors of each winding being arranged half in the top and half in the bottom of the slots.

7. In an alternating-current motor, a slotted core, and two electrically independent windings of different pole numbers composed of interlaced coils all equal in size carried in the slots, each coil of each winding being arranged with one side in the top and the other side in the bottom of a slot.

8. In an alternating-current motor, a slotted core, and two electrically independent windings of different pole numbers composed of interlaced coils all equal in size carried in the slots, each winding having only one coil in each slot and each coil being arranged with one side in the same slot with the opposite side of a coil of the other winding.

9. In an alternating-current motor, a slotted core, and distributed coils all equal in size carried two in each slot, the coils being connected in independent sets to form two independent windings of different pole numbers and the two coils in each slot being connected in different windings.

10. In an alternating-current motor, a slotted core, and distributed coils all equal in size carried two in each slot, each coil being arranged with one side in the top and the other in the bottom of the slots, the coils being connected in independent sets to form two independent windings of different pole numbers, and the two coils in each slot being connected in different windings.

11. In an alternating-current motor, a slotted core, and distributed coils all equal in size carried two in each slot, each coil being arranged with one side at the top and the other at the bottom of a slot and the coils being connected in independent sets to form two independent windings of different pole numbers.

12. In an alternating-current motor, a slotted core, and two independent windings of different pole numbers composed of interlaced coils all equal in size carried in said slots, the conductors of each winding being arranged half in the top and half in the bottom of the slots.

13. In an alternating-current motor, a slotted core provided with distributed coils all equal in size interlaced to form mechanically a single winding and electrically connected in independent sets to form two separate windings of different numbers of poles, and means for varying the number of poles of one or both of said windings.

14. In an alternating-current motor, a slotted core provided with distributed coils all equal in size interlaced to form mechanically a single winding and electrically connected in independent sets to form two separate windings of different numbers of poles, and means for reversing the relative direction of current-flow through one half of one or both of said windings.

15. In an alternating-current motor, a slotted core, two electrically independent windings of different pole numbers composed of interlaced coils all equal in size carried in the slots, the conductors of each winding being arranged half in the top and half in the bottom of the slots, and means for varying the number of poles of one or both of said windings.

16. In an alternating-current motor, a slotted core, two electrically independent windings of different pole numbers composed of interlaced coils all equal in size carried in the slots, the conductors of each winding being arranged half in the top and half in the bottom of the slots, and means for reversing the relative direction of current-flow through one-half of one or both of said windings.

17. In an alternating-current motor, a slotted core, distributed coils all equal in size carried two in each slot, the coils being connected in independent sets to form two independent windings of different pole numbers and the two coils in each slot being connected in different windings, and means for varying the number of poles of one or both of said windings.

18. In an alternating-current motor, a slotted core, distributed coils all equal in size carried two in each slot, the coils being connected in independent sets to form two independent windings of different pole numbers and the two coils in each slot being connected in different windings, and means for reversing the relative direction of current-flow through one-half of one or both of said windings.

19. In an alternating-current motor, a slotted core, distributed coils all equal in size carried two in each slot, each coil being arranged with one side in the top and the other in the bottom of the slots, the coils being connected in independent sets to form two independent windings of different pole numbers, and the two coils in each slot being connected in different windings, and means for varying the number of poles of one or both of said windings.

20. In an alternating-current motor, a slotted core, distributed coils all equal in size carried two in each slot, each coil being arranged with one side in the top and the other in the bottom of the slots, the coils being connected in independent sets to form two independent windings of different pole numbers, and the two coils in each slot being connected in different windings, and means for reversing the direction of current-flow through one-half of one or both of said windings.

21. In an alternating-current motor, a slotted core provided with distributed coils all equal in size interlaced to form mechanically a single winding and electrically connected to form two electrically independent sets of windings of different number of poles, one or both of said windings having its coils divided into groups with terminal connections so arranged that by reversing the connections of the groups relatively to one another the number of poles produced by the winding will be changed.

In witness whereof, I have hereunto set my hand this 18th day of August, 1905.

ERNST F. W. ALEXANDERSON.

Witnesses:
 BENJAMIN B. HULL,
 HELEN ORFORD.